UNITED STATES PATENT OFFICE.

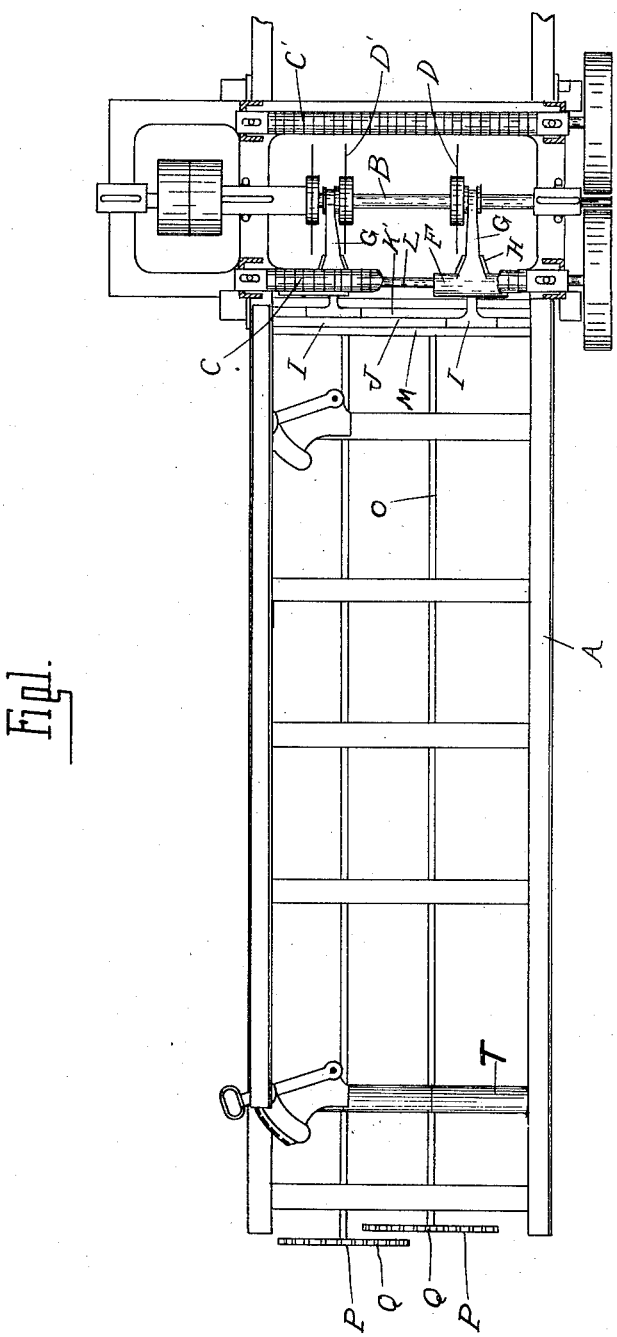

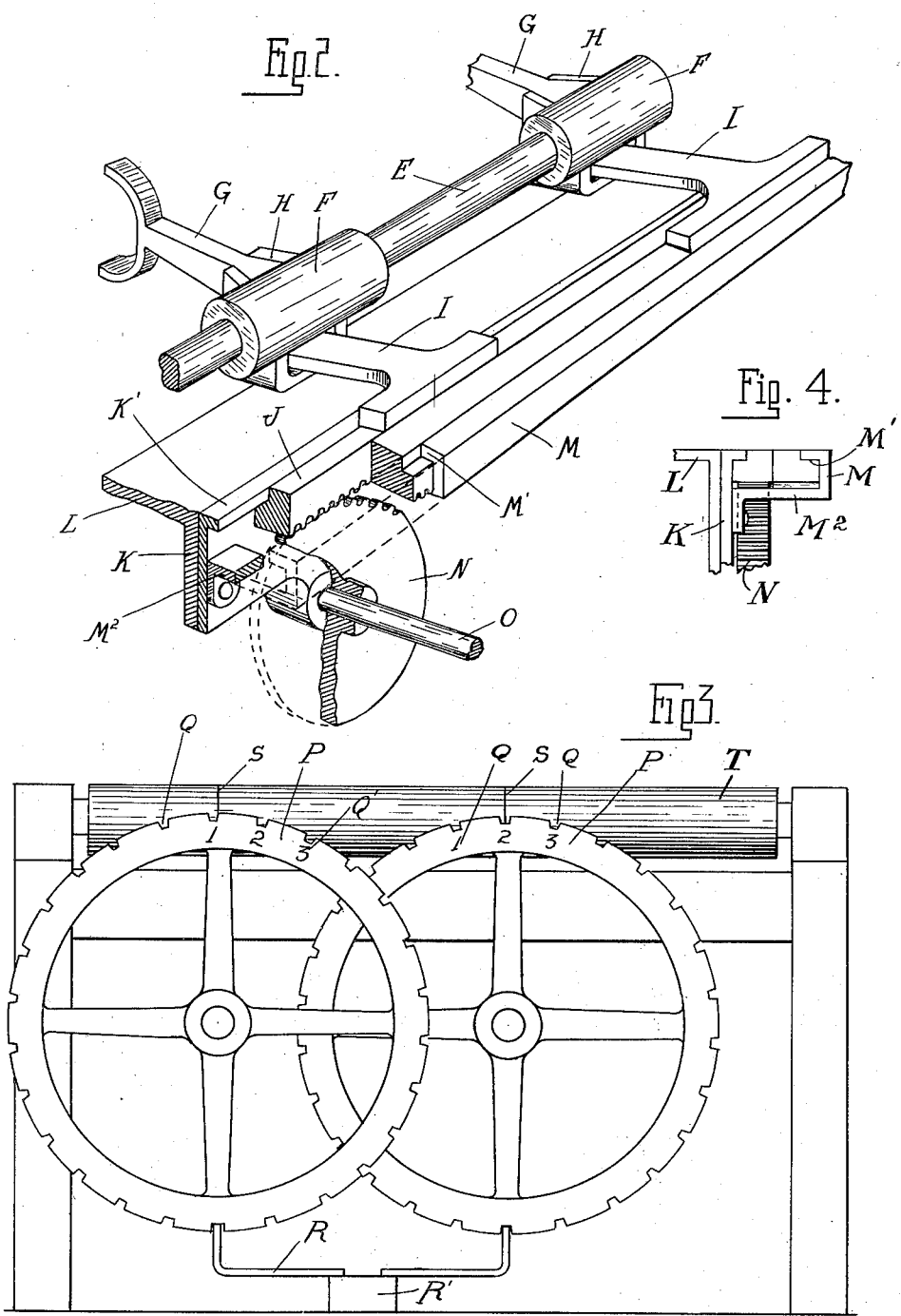

RAY J. TOWER, OF GREENVILLE, MICHIGAN, ASSIGNOR OF ONE-HALF TO THE GORDON HOLLOW BLAST GRATE COMPANY, OF GREENVILLE, MICHIGAN, A CORPORATION OF MICHIGAN.

EDGER.

1,002,883.      Specification of Letters Patent.      Patented Sept. 12, 1911.

Application filed May 14, 1908. Serial No. 432,860.

*To all whom it may concern:*

Be it known that I, RAY J. TOWER, a citizen of the United States of America, residing at Greenville, in the county of Montcalm and State of Michigan, have invented certain new and useful Improvements in Edgers, of which the following is a specification, reference being had therein to the accompanying drawings.

The invention relates to edgers, and the invention consists in the means employed for adjusting the shiftable saws as hereinafter set forth.

In the drawings—Figure 1 is a plan view of the machine; Fig. 2 is a perspective view of a portion of the shifting mechanism; and Fig. 3 is an end elevation showing the indexed hand wheels for the shifting mechanism. Fig. 4 is a fragmentary end view of the guide for the slidable member.

A is the frame of the machine, B the arbor; C and C' the feed rolls and D and D' the shiftable saws upon the arbor. Parallel to the arbor B is a guide E upon which is sleeved a plurality of slidable members F, one for each of the shiftable saws. These members F are connected with the saws by a detachable connection preferably an arm G which is detachably secured in a socket H in the member F, and is laterally removable therefrom. This member G may either engage the rim of the saw or a grooved collar, the latter construction being shown. The arrangement is such that when the member F is slid upon the guide E the saw will be correspondingly moved on the arbor.

For operating the members F, each of these members is connected by a laterally extending arm I with a rack bar J, and these rack bars are arranged parallel to each other and are slidably secured in bearings to extend transversely of the bed of the machine. As illustrated, the machine is provided with two adjustable saws and two rack bars are accordingly provided. The bearing in which these rack bars are mounted preferably comprises a member K which is bolted to one of the bars L of the frame, and is provided with a flange K' engaging a groove or rabbet in one of the rack bars. A second member M having an oppositely extending flange M' is arranged to embrace the bars and is secured by ears M² to the member K. Thus the two bars are independently slidably secured in the bearing.

N are pinions intermeshing with the rack bars J and mounted upon shafts O which extend longitudinally of the frame beneath the bed. The outer ends of these shafts extend to the end of the bed and have mounted thereon the indexed hand wheels P, each of these being arranged with its periphery slightly below the level of the plane of the bed. Q are notches in the periphery of the wheels P, which are so spaced as to divide the wheels into the desired number of gradations, and these are preferably marked by numerals Q' upon the face of the wheel.

R is a spring latch for engaging a notch at the bottom of the wheel, this latch being preferably formed of a resilient bar attached to a stand R' secured to the floor.

With the construction as described, the operator may shift the saws by merely rotating the hand wheels P which through the medium of the shafts O rotate the pinions N and adjust the rack bars J. As these bars are connected by arms I to the members F and the latter through the arms G are connected to the saws, it will be apparent that any movement of the hand wheel P will produce a corresponding movement of the saw. To provide freedom of adjustment of the hand wheels P no index finger is employed, but to assist the operator in setting the wheels a groove or marking S is placed on the table roll T at the end of the bed. Thus the operator may readily set the hand wheel with the notch of the desired numeral arranged at the top in line with the marking S, while the spring latch R, which is at the bottom of the wheel, will exactly determine its position.

What I claim as my invention is:

1. The combination with the frame, the arbor and a plurality of slidable saws mounted on said arbor, of a guide on said frame parallel with the arbor, a plurality of rack bars slidably carried by said guide, a guide rod also parallel with the arbor, sleeves slidable on said guide, arms connecting said sleeves with said saws, an arm connecting each of said rack bars with its respective sleeve, and means for shifting said rack bars.

2. The combination with the frame, the arbor and a plurality of shiftable saws mounted on said arbor, of a guide parallel to said arbor, a plurality of sleeves slidable upon said guide, arms connecting said sleeves with said saws, a plurality of racks parallel with said guide and arbors, a common guide for all of said racks, arms connecting the racks with the sleeves, pinions meshing with said racks, shafts upon which said pinions are mounted, and hand wheels on said shafts.

In testimony whereof I affix my signature in presence of two witnesses.

RAY J. TOWER.

Witnesses:
 CRAIG WALKER,
 ELVA S. FRIES.